United States Patent [19]

Sato et al.

[11] 4,154,615

[45] May 15, 1979

[54] COLOR DIFFUSION TRANSFER UNIT WITH POLYMERIC QUATERNARY NITROGEN MORDANT

[75] Inventors: Yuzuru Sato, Hachioji; Masao Asano, Tokyo; Masao Ishihara, Hino; Sadatugu Terada, Hachioji, all of Japan

[73] Assignee: Konishiroku Photo Industry Co., Ltd., Tokyo, Japan

[21] Appl. No.: 808,908

[22] Filed: Jun. 22, 1977

[30] Foreign Application Priority Data

Jun. 24, 1976 [JP] Japan .................................. 51-74689

[51] Int. Cl.² .......................... G03C 1/40; G03C 7/00; G03C 1/02; G03C 1/84
[52] U.S. Cl. ............................................. 96/77; 96/3; 96/29 D; 96/84 A; 96/114
[58] Field of Search .................... 96/3, 29 D, 77, 114, 96/84 A; 101/464

[56] References Cited

U.S. PATENT DOCUMENTS

| | | | |
|---|---|---|---|
| 3,756,814 | 9/1973 | Bedell | 96/77 |
| 3,930,864 | 1/1976 | Abel et al. | 96/77 |

*Primary Examiner*—Richard L. Schilling
*Attorney, Agent, or Firm*—Bierman & Bierman

[57] ABSTRACT

A color diffusion transfer photographic unit is disclosed which contains a silver halide photosensitive element having a support and at least one silver halide emulsion layer thereon and an image receiving element having a support and an image receiving layer thereon wherein the unit contains a polymer having a first monomer which contains a tertiary nitrogen atom wherein at least 5 mole % of said first monomer is grafted and/or graft-copolymerized with a second monomer which is a vinyl monomer having a tertiary or quaternary nitrogen.

13 Claims, No Drawings

COLOR DIFFUSION TRANSFER UNIT WITH POLYMERIC QUATERNARY NITROGEN MORDANT

This invention relates to a color diffusion transfer unit comprising a photosensitive element and a receiving element and particularly to a color diffusion transfer unit using a novel polymer mordant. More particularly, the invention is concerned with a color diffusion transfer unit, according to which a polymer mordant used shows an excellent effect as mordant without adversely affecting photographic properties and is excellent in film-forming property even when used singly or in combination with a binder, and moreover no deterioration in storability of an image formed thereby is observed.

In a color diffusion transfer method, a light-sensitive element comprising a silver halide emulsion and a dye image forming substance is subjected to exposure to light, thereby to form a latent image in the silver halide, and then the exposed element is subjected to a development treatment with a processing agent (an alkaline processing solution). At the time of the processing, the light-sensitive element and an image-receiving element having an image-receiving layer capable of functioning as mordant are placed in such a state that the light-sensitive element is brought into contact with the image-receiving layer and said dye image forming substance is transferred by diffusion to said image-receiving layer to obtain a dye image thereon.

As examples of the above-mentioned color diffusion transfer methods, there may be mentioned a method disclosed in U.S. Pat. No. 2,983,606, wherein a dye developer which is a dye having a function to develop silver halide and also capable of developing the exposed silver halide emulsion is used as a dye image forming substance and a method disclosed in U.S. Pat. Nos. 2,647,049 and 2,774,668, wherein a latent image is developed with a color developer, thereby releasing a dye image forming substance. An image-receiving element used in the above-mentioned methods has on an opaque or transparent support an image-receiving layer containing a polymer mordant which is water-permeable and alkali-permeable. As known polymer mordants to be incorporated into the image-receiving layer, there may be mentioned poly-4-vinylpyridine disclosed in U.S. Pat. No. 3,148,061 and various kinds of vinyl type quaternary salt polymers disclosed in British Pat. No. 1,261,925.

When a dye image forming substance is diffused to move in an image-receiving element, a polymer mordant present in an image-receiving layer desirably forms in a short time a dye image on the image-receiving layer, which dye image formed is high in density. After formation of an image on the image-receiving layer, on the other hand, said image is required to remain unchanged permanently thereafter. For that purpose, development of silver halide as well as formation and diffusion of dyes related thereto are stopped by means of decreasing alkalinity of the image-receiving layer by neutralization which alkalinity increases by a processing solution (an alkaline processing solution). However, after obtaining an image, excess of the dye and dye precursor as well as contaminants are not always fixed not to be moved. In such case, the excess of the dye and dye precursor as well as contaminants gradually diffuse in the image-receiving layer to cause a gradual change in quality of an image after completion of the treatment. For this reason, it has heretofore been practiced to eliminate the above-mentioned drawback by the use of a layer containing a scavenging substance (the so-called scavenger layer) in an image-receiving element in addition to an image-receiving layer. The scavenger layer of this kind heretofore known includes a layer disclosed in U.S. Pat. No. 3,725,063, involving the use of isocyanate-bissulfite addacts, a layer disclosed in U.S. Pat. No. 3,770,431, in which a resorcinol scavenger is used, a layer disclosed in U.S. Pat. No. 3,772,041, in which a polymer scavenger is used, and such a scavenger layer disclosed in Japanese Laid-Open-to-Public Patent Publication No. 142233/1975, which scavenger layer is provided independently from an image-receiving layer. It is also known that the scavenger layer may be provided either in an image-receiving element or in other photographic elements such as a processing sheet.

The present inventor has found that a grafted polymer mentioned later is effectively usable as a mordant for a dye image forming substance and, moreover, that such polymer may be effectively used either in an image-receiving layer or a scavenger layer or other layers having a fuction of mordant. The present invention has been accomplished on the basis of the above finding.

That is, a primary object of the present invention is to provide a color diffusion transfer unit excellent in mordant effect.

A second object of the present invention is to provide a color diffusion transfer unit in which an image-receiving layer is used, which layer mordants at the time of development treatment a dye image forming substance when said substance is diffused to move in an image-receiving element and forms in a short time a favorable dye image which is high in density.

A third object of the present invention is to provide a color diffusion transfer unit using a scavenger layer which is capable of preventing, after formation of a favorable image following completion of the treatment, the excess of dye and dye precursor as well as contaminants from diffusion into the image-receiving element and maintaining favorably storability of the image.

A fourth object of the present invention is to provide an image-receiving element or a processing sheet used in a color diffusion transfer unit, which element or sheet is capable of displaying an excellent mordant effect without adversely affecting photographic properties.

A fifth object of the present invention is to provide a color diffusion transfer unit using a layer containing a polymer mordant which is excellent in film-forming property even when used singly or in combination with a binder.

A sixth object of the present invention is to provide a color diffusion transfer method using a polymer mordant which is used in an image-receiving layer in an image-receiving element without adversely affecting a silver halide emulsion layer and which may be usable not only in a scavenger layer in the image-receiving element, a processing sheet or a light-sensitive element but also in any mordant layer in the image-receiving element, processing sheet or light-sensitive element.

These objects and other objects of the present invention which will be mentioned later may be accomplished by the use, as an image-receiving layer and/or a scavenger layer or other mordant layer in the color diffusion transfer unit, of a layer containing a polymer mordant prepared by grafting on or graft polymerizing at least 5 mole% of a vinyl monomer containing a tertiary nitrogen atom or quaternary nitrogen atom with a backbone polymer which is a polymer containing as a polymeric component a monomer containing a tertiary nitrogen atom capable of being converted into a salt of an organic or inorganic acid.

Usable in the present invention as a monomer component containing a tertiary nitrogen atom capable of being converted into a salt of an organic or inorganic acid, is preferably a compound represented by the following general formula [I].

General formula [I]

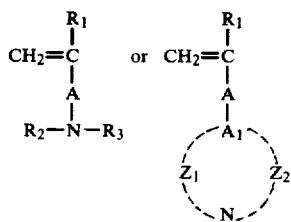

wherein $R_1$ represents hydrogen or a methyl group, $R_2$ and $R_3$ individually represent a lower alkyl group (alkyl group having 1–4 carbon atoms), phenyl group or aralkyl group, and $R_2$ and $R_3$ may cooperatively form a 5- or 6-membered heterocyclic ring containing the nitrogen which ring may have a substituent or substituents, A represents a simple bond or a bond group comprising at least two atoms out of hydrogen, carbon, nitrogen and oxygen; and $A_1$, $Z_1$ and $Z_2$ are atoms necessary to complete a 5- or 6-membered heterocyclic ring containing the nitrogen, which ring may have a substituent and substituents. The 5- or 6-membered heterocyclic rings may further contain nitrogen or oxygen. In the above formula, the bonding group comprising at least two atoms out of hydrogen, carbon, nitrogen and oxygen represents an alkylene (particularly, having 1–20 carbon atoms), arylene and alkarylene group, —COO—A'—, —CONH—A'— or —O—A'— wherein A' represents alkylene (particularly having 1–20 carbon atoms).

These alkylene, arylene and alkarylene group include substituted ones with an optional substituent, for example, hydroxy or an alkyl or aryl group.

In the above formula, the 5- or 6-membered heterocyclic rings preferably represent pyridine, pyrimidine pyridazine, imidazoline, imidazole, oxazoline, oxazole or morpholine ring. The substituent or substituents for the heterocyclic rings are preferably a lower alkyl group or groups.

Preferably usable in the present invention as the monomer components having a tertiary nitrogen atom capable of being converted into a salt of an organic or inorganic acid, are those typically exemplified below.

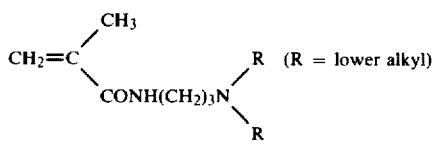

(R = lower alkyl)

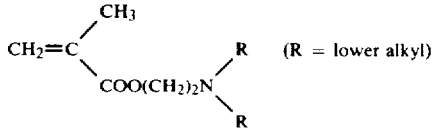

(R = lower alkyl)

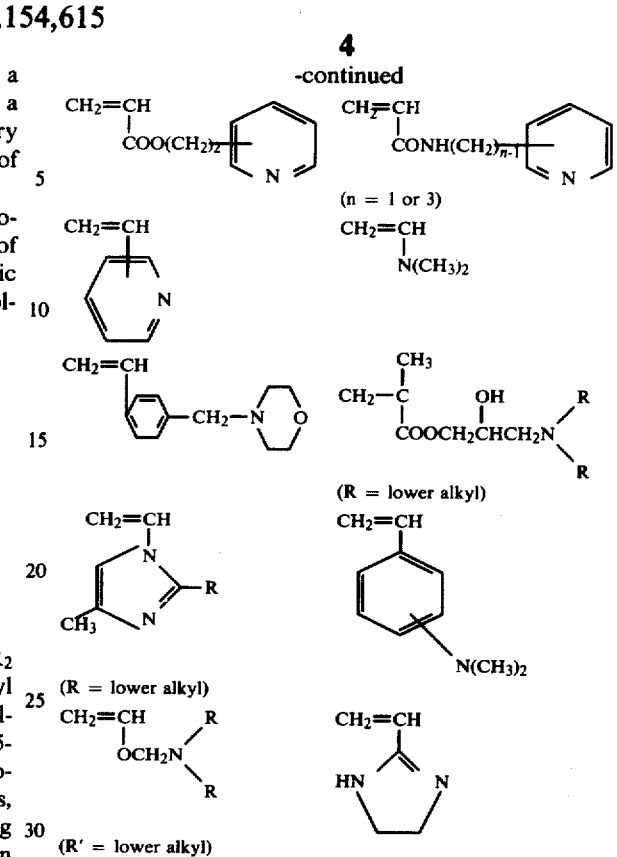

(R' = lower alkyl)

The vinyl monomer component having a tertiary or quaternary nitrogen atom usable in the present invention includes preferably compounds represented by the following general formula [II] or [III].

General formula [II]

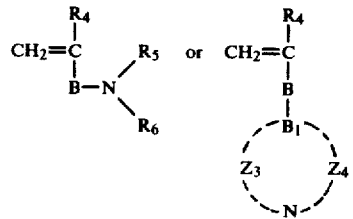

General formula [III]

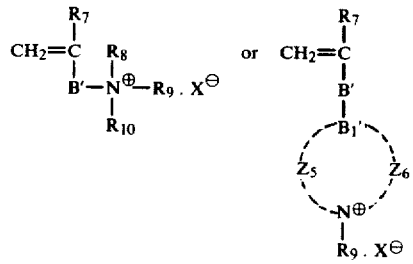

wherein $R_4$ and $R_7$ individually represent hydrogen, halogen or a methyl group, $R_5$ and $R_8$ individually represent a lower alkyl group (alkyl group having 1–4 carbon atoms), phenyl group or aralkyl group and $R_5$ and $R_6$ as well as $R_8$ and $R_{10}$ may cooperatively form a 5- or 6-membered heterocyclic ring containing the nitrogen which ring may have a substituent or substituents, $R_6$ and $R_9$ individually represent a lower alkyl group (alkyl group having 1-4 carbon atoms) or aralkyl group, R₁₀ represents a hydrogen atom, a lower alkyl group (alkyl group having 1-4 carbon atoms) or aralkyl group, B and B' represent a simple bond or a bond group comprising at least two atoms out of hydrogen, carbon, nitrogen and oxygen; and B₁, Z₃ and Z₄, and B₁', Z₅ and Z₆ are atoms necessary to complete a 5- or 6-membered heterocyclic ring containing the nitrogen, which ring may have a substituent and substituents. The heterocyclic ring may further contain nitrogen or oxygen.

In above general formulas [II] and [III], the bond group comprising at least two atoms out of hydrogen, carbon, nitrogen and oxygen is as defined for A in the general formula [I]. In the above formulas, the 5- or 6-membered heterocyclic rings and the substituents therefor preferably represent as defined for such the rings and the substituents therefor respectively in the general formula [I].

X represents anion, preferably halogen (e.g. chlorine, bromine, iodine etc), arylsulfonate (e.g. p-toluenesulfonate etc) and alkylsulfonate (e.g. methyl-sulfonate, ethylsulfonate etc), nitrate, sulfonate and the like.

Typical examples of the vinyl monomer component containing a tertiary or quaternary nitrogen atom preferably usable in the present invention include those exemplified below.

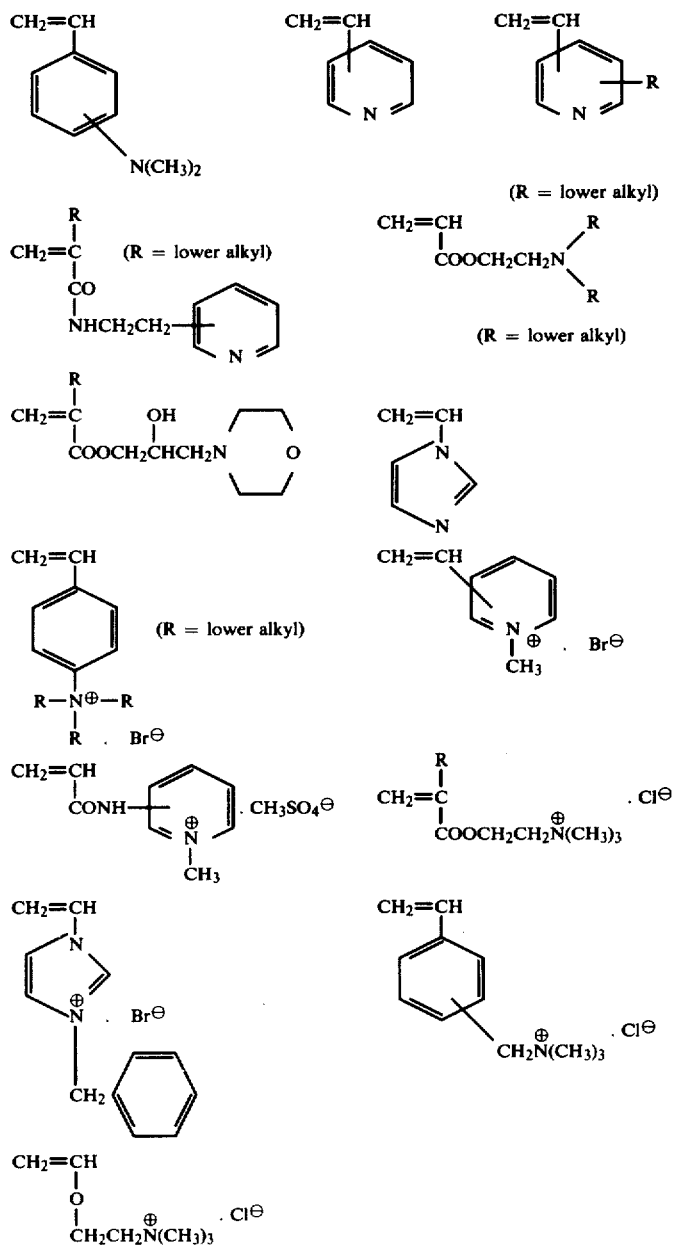

The compound of the present invention, namely, a polymer prepared by grafting or graft polymerizing at least 5 mole% of a vinyl monomer containing a tertiary or quaternary nitrogen atom with a backbone polymer containing, as a polymeric component, a monomer containing a tertiary nitrogen atom capable of being converted into a salt of an organic or inorganic acid, may be a copolymer containg other comonomers. In this case, a mole ratio, based on the copolymer, of a moler part prepared by grafting or graft polymerizing at least 5 mole% of a vinyl monomer containing a tertiary or quaternary nitrogen atom with a backbone polymer is preferably more than 25%. The mode of copolymerization is not particularly limited and copolymers of any form likewise show the expected effect. Representative monomers as the aforesaid other copolymeric components in the compound of the present invention include, for example, saturated aliphatic carboxylic acid vinyls such as vinyl acetate and vinyl butyrate; acrylic esters such as methyl acrylate, ethyl acrylate, n-butyl acrylate, methyl methacrylate, n-butyl methacrylate, methyl α-chloroacrylate, 2-hydroxyethyl acrylate and 2-N,N-dimethylaminoethyl acrylate; olefins such as ethylene, propylene and isobutylene; halogenated olefins such as vinyl chloride and vinylidene chloride; dienes such as butadiene and isoprene; nitriles such as acrylonitrile and methacrylonitrile; aromatic unsaturated hydrocarbons such as styrene and methyl styrene; acrylamides such as acrylamide, N,N-dimethylacrylamide and diacetone acrylamide; vinyl ethers such as vinyl methyl ether and vinyl ethyl ether; and N-vinyl pyrrolidone, fluorinated vinyl compounds such as

$CF_2=CF_2$, $CH_2=CF_2$, $CH_2=CH-CF_2$,

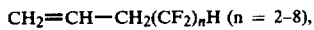
$CH_2=CH-CH_2(CF_2)_nH$ (n = 2-8),

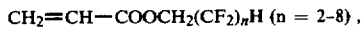
$CH_2=CH-COOCH_2(CF_2)_nH$ (n = 2-8),

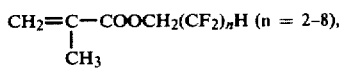
$CH_2=C-COOCH_2(CF_2)_nH$ (n = 2-8),
$\quad\quad |$
$\quad\quad CH_3$

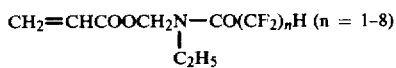
$CH_2=CHCOOCH_2N-CO(CF_2)_nH$ (n = 1-8)
$\quad\quad\quad\quad\quad\quad\quad |$
$\quad\quad\quad\quad\quad\quad\quad C_2H_5$ The polymer mordant of the present invention may have any molecular weight, which however is preferably from 5,000 to 1,000,000 and more preferably from 10,000 to 500,000. In case of polymer prepared by grafting or graftpolymerizing only a monomer other than a vinyl monomer having a tertiary or quaternary nitrogen atom with the backbone polymer, no effect on accomplishment of the objects of the present invention can be displayed.

In the present invention, a layer containing the polymer of the invention (hereinafter called "the present polymer mordant") may be used not only as an image-receiving layer of an image-receiving element and as a scavenger layer of the image-receiving element, processing sheet or light-sensitive element but also the other layer functioning as a mordant in the image-receiving element, processing sheet or light-sensitive element. The present polymer mordant may be used singly as any of the image-receiving layer, scavenger layer and the other layer functioning as a mordant and may also be used as a layer combining two or more of these layers. That is, the present polymer mordant may be incorporated only into an image-receiving layer in an image-receiving element, or may be incorporated in a scavenger layer which is provided at least one of the image-receiving layer, image-receiving element, processing sheet and light-sensitive element, or may be incorporated into only a scavenger layer which is provided at least in one of the image-receiving element, processing sheet and light-sensitive element, or may be incorporated into other layers functioning as a mordant in the image-receiving element, processing sheet or light-sensitive element. Because the present polymer mordant does not exert any detrimental influence on a silver halide layer, a layer containing the present polymer mordant may be used as a scavenger layer in a light-sensitive element or the other layer functioning as a mordant (excluding a silver halide emulsion layer).

The present polymer mordant may be any of polymers so long as the polymers are those prepared by grafting or graft polymerizing at least 5 mole% of a vinyl monomer containing a tertiary or quaternary nitrogen atom with the afore-mentioned backbone polymer. The present polymer mordants may be used either singly or in the form of a combination of two or more.

The present polymer mordant may optionally used in combination with other polymer mordants, provided that no detrimental effect is exerted on the action and effect of the present invention.

Typical examples of the present polymer mordant are illustrated below, but the polymer mordants usable in the present invention are not limited only thereto. (MW means an average molecular weight.)

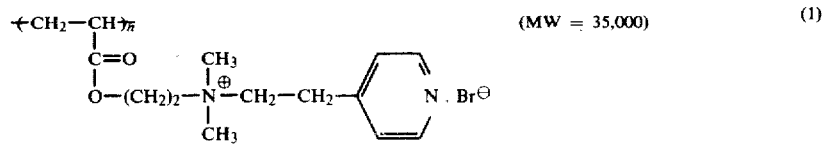

(MW = 35,000) (1)

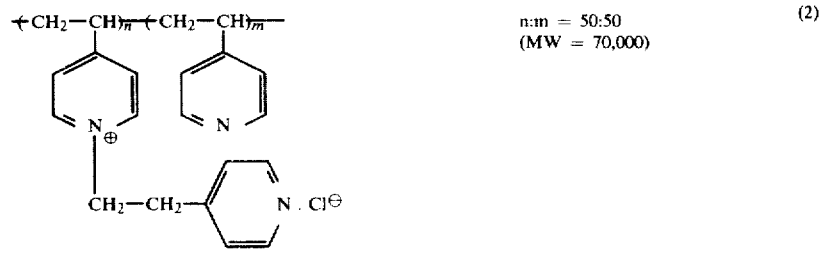

n:m = 50:50
(MW = 70,000) (2)

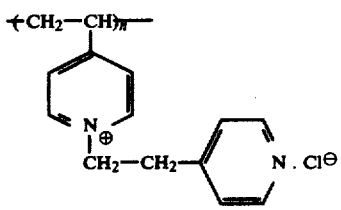 (MW = 65,000) (3)
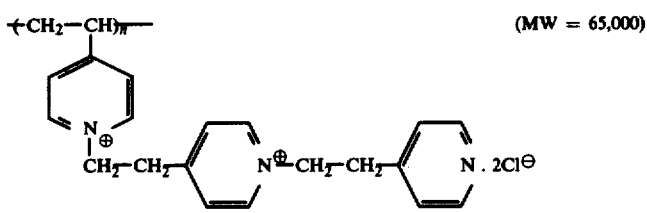 (MW = 65,000) (4)
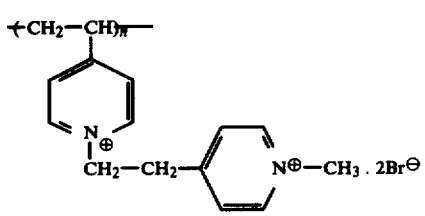 (MW = 65,000) (5)
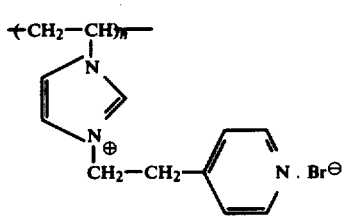 (MW = 33,000) (6)
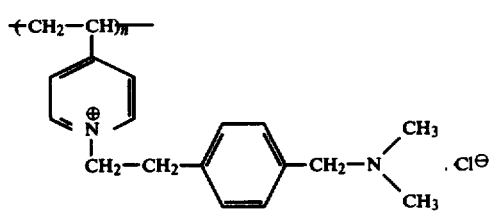 (MW = 25,000) (7)
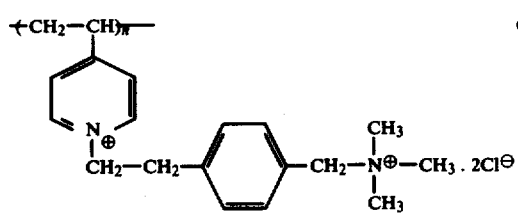 (MW = 25,000) (8)
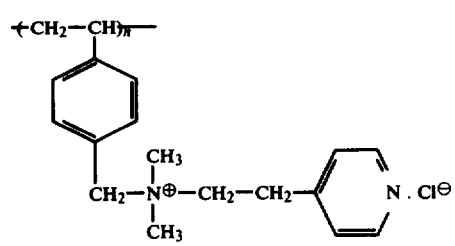 (MW = 50,000) (9)

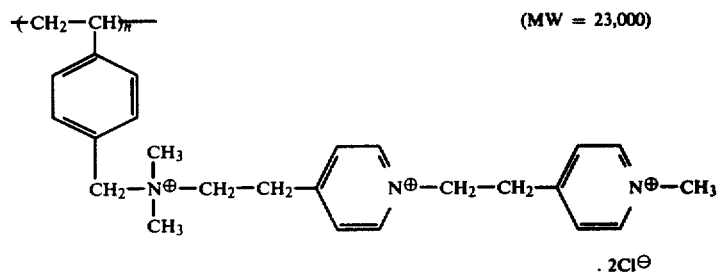 (10) (MW = 23,000)
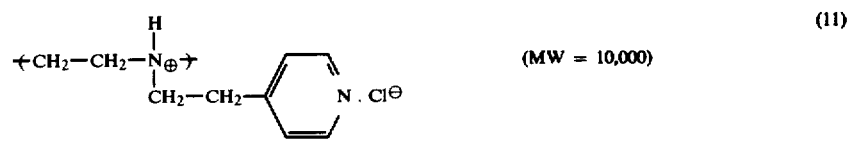 (11) (MW = 10,000)
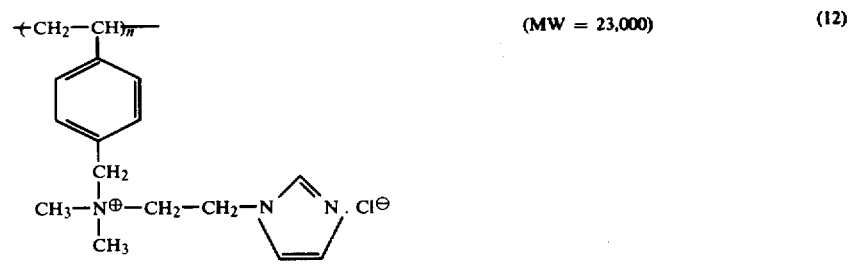 (12) (MW = 23,000)
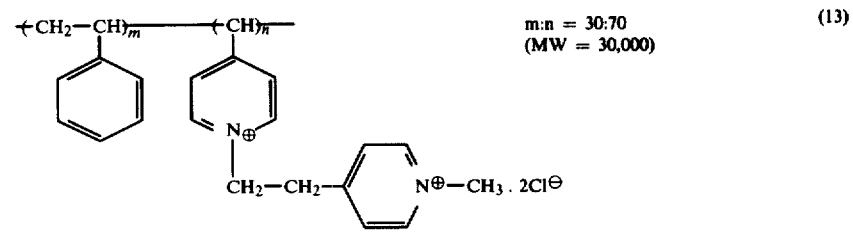 (13) m:n = 30:70 (MW = 30,000)
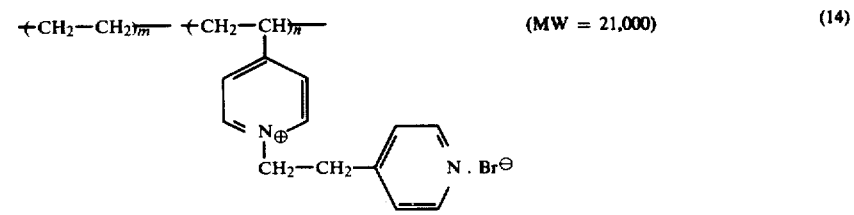 (14) (MW = 21,000)
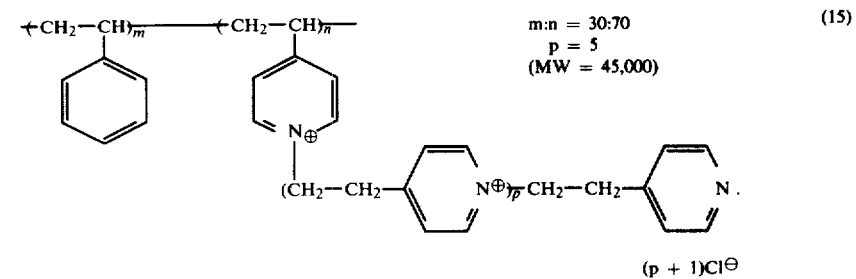 (15) m:n = 30:70 p = 5 (MW = 45,000)

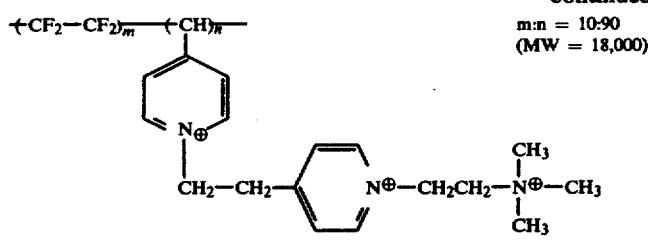

(16)

m:n = 10:90
(MW = 18,000)

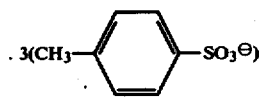

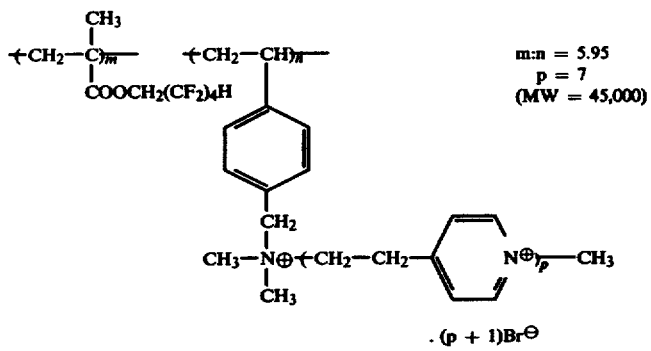

(17)

m:n = 5:95
p = 7
(MW = 45,000)

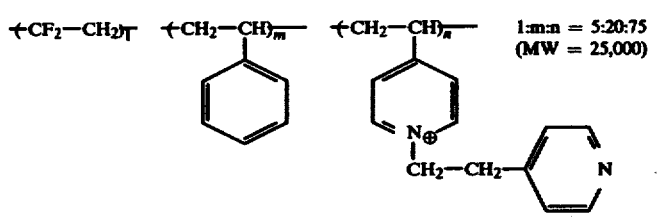

(18)

l:m:n = 5:20:75
(MW = 25,000)

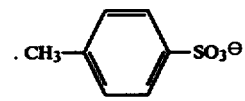

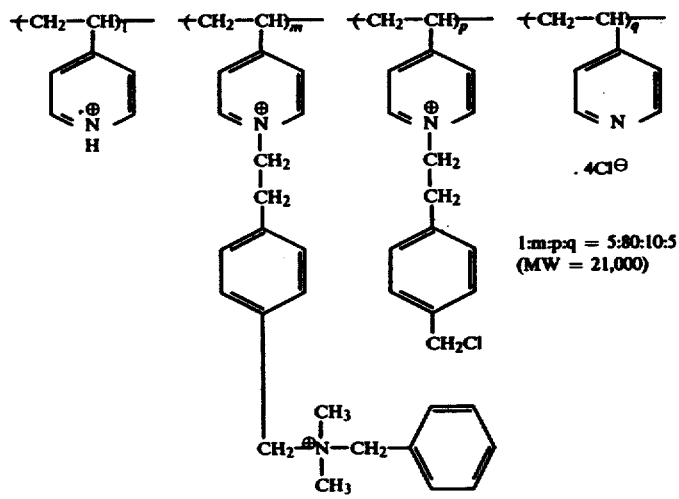

(19)

l:m:p:q = 5:80:10:5
(MW = 21,000)

The polymer mordant of the present invention can be synthesized, for example, in the following manner.

4-vinyl pyridine (4 VP) was washed with 0.1 N sodium hydroxide and then dried over calcium chloride. The monomeric 4VP was distilled under reduced pressure just prior to its use.

Poly (4-vinyl pyridine) was prepared by polymerization in methanol at 60° C. using azobisisobutyronitrile as the initiator.

The grafting operation was carried out in two steps. First, a methanolic solution of P4VP was reacted at 50° C. with a methanolic solution of hydrochloric acid. The quantity of HCl was always in excess. The resulting poly(4-vinyl pyridinium chloride) was recovered by precipitation in dry ethyl ether. This precipitation was necessary in order to avoid the polymerization of 4VP in the presence of HCl during the next step.

The second step involved the reaction of 4VP with the quaternized P4VP for several hours in a methanolic solution at 50°. Then, the grafted polymer was recovered by precipitation in dry ethyl ether. Both the quaternized P4VP and grafted quaternized P4VP were white and strongly hydroscopic products.

A layer containing the polymer mordant of the present invention is used as an image-receiving layer and/or scavenger layer. In the former case where the present polymer mordant is used as an image-receiving layer of image-receiving element, a support for the image-receiving element may be coated on the surface with the present polymer mordant to form the desired image-receiving layer. For instance, the present polymer mordant or its solution is desirably coated on a support, of which the surface has been coated successively with a neutralization layer containing a neutralizing agent such as a polymer acid, and an intermediate layer. The present polymer mordant or its solution, however, may also be coated directly on a support without forming such neutralization layer and intermediate layer on the support.

The polymer mordant of the present invention is preferably used, when it is in the form of a solution, for example, as a 2 to 20% solution. As a solvent, though not critical, there may be used, for example, water or hydrophilic solvents such as methanol, ethanol, acetone, methyl cellosolve, dioxane and N,N-dimethylformamide, either singly or in the admixture thereof.

Usable as a support for the aforementioned image-receiving element may be any of a variety of materials, for example, baryta paper, polyethylene-laminated paper, cellulose organic acid ester sheets such as cellulose diacetate, cellulose triacetate and cellulose acetate butyrate, sheets of inorganic acid esters such as cellulose nitrate, sheets of polyesters such as polyethylene terephthalate, sheets of polyvinyl esters such as polyvinyl acetate, sheets of polyvinyl acetals such as polyvinyl acetal, and sheets of polyalkylenes such as polystyrene, polypropylene and polyethylene, and these sheets may be selected according to the object.

Usable as a neutralization layer in the present invention may be a layer which contains a neutralizing agent and which lowers a pH value of the system after the development treatment. The neutralizing agent may preferably be a film-forming polymer acid having at least one carboxyl group, sulfone group or a group forming a carboxyl group on hydrolysis, and any polymer acids may be usable so long as they have such properties as mentioned above. The polymer acids usable in the present invention are preferably those having molecular weight of about 10,000 to about 100,000. For example, the usable polymer acids include those disclosed in U.S. Pat. No. 3,362,819 such as monobutyl esters of a 1:1 maleic anhydride/ethylene copolymer, monobutyl esters of a 1:1 maleic anhydride/methylvinyl ether copolymer, monoethyl esters, monopropyl esters, monopentyl esters and monohexyl esters of a 1:1 maleic anhydride/ethylene copolymer, monoethyl esters, monopropyl esters, monopentyl esters and monohexyl esters of a 1:1 maleic anhydride/methyl vinyl ether copolymer, and copolymers of polyacrylic acid and polymethacrylic acid, and of acrylic acid and methacrylic acid in varying proportions, copolymers of acrylic or methacrylic acid with other vinyl monomers in varying proportions, i.e. copolymers containing at least 30 mole%, preferably 50 to 90 mole%, of acrylic or methacrylic acid such as acrylates, methacrylates and vinyl esters. In addition thereto, there may be used, if necessary in combination with a binder, such polymer acids disclosed in "Research Disclosure", No. 12331 as metals, monomer acids, balasted organic acids, alkylphosphates, polyalkylphosphates and poly(1-acroyl-2,2,2-trimethylhydradinium p-toluenesulfonate). Further, polymer acids, monomer acids or polymer acids and amines may be used in combination therewith.

The above-mentioned polymer acids, monomer acids, organic amines and binder polymers are dissolved in alcohols such as methanol, ethanol, propanol and butanol, ketones such as acetone, methyl ethyl ketone, diethyl ketone and cyclohexanone, esters such as ethyl acetate, isopropyl acetate and butyl acetate or mixtures thereof and the resulting solution may be coated on a support.

A thickness of the neutralization layer cannot be specifically decided since the layer may vary in thickness depending on the composition and amount of the processing agent used and the kind of the material used as a neutralizing agent. Generally, however, the thickness range of 5 to 30 microns is appropriate.

The above-mentioned neutralization layer may be located in any place of a photographic element according to the layer-construction thereof. For instance, the neutralization layer may be formed between an image-receiving layer and a support therefor as disclosed in U.S. Pat. Nos. 3,415,644, 3,473,925, 3,415,646 and 3,415,645; between a light-sensitive layer and a support therefor as disclosed in U.S. Pat. Nos. 3,573,043 and 3,573,042; in a processing sheet or between an image-receiving layer and the support therefor; and between a light-sensitive layer and the support therefor and/or between an image-receiving layer and the support therefor when layers of the photographic element are constructed in the manner as disclosed in U.S. Pat. No. 3,615,421. Furthermore, the neutralization layer may be formed between an image-receiving layer and a support therefor when layers of the photographic element are constructed in the manner as disclosed in Japanese Laid-Open-to-Public Patent Publication No. 3480/1972.

In the present invention, there may be formed an intermediate layer (the so-called timing layer) in order to control the decrease degree of pH, coupled with the above-mentioned neutralization layer. This intermediate layer plays a role in retarding the decrease degree of pH until a necessary development and transfer operations are over.

That is, this intermediate layer prevents an undesirable decrease in density of the transferred image due to a rapid decrease of pH value within the system, prior to development of a silver halide and formation of a diffuse transferred image, by the action of the neutralization layer.

As the intermediate layer, there may be used a variety of materials, for example, gelatin, polyvinyl alcohol and partially acetalated products of polyvinyl alcohol as disclosed in U.S. Pat. No. 3,362,819; cyanoethylated polyvinyl alcohol as disclosed in U.S. Pat. No. 3,419,389; hydroxypropylmethyl cellulose and isopropyl cellulose as disclosed in U.S. Pat. No. 3,433,633; polyvinylamides as disclosed in Japanese Patent Publication No. 1267/1971; polyvinylamide graft copolymers as disclosed in Japanese Patent Publication No. 41214/1973; and a combination of a liquid latex and a permeating agent as disclosed in Japanese Laid-Open-to-Public Patent Publications Nos. 22935/1974 and 91642/1974.

In the case where a layer containing the present polymer mordant is used as a scavenger layer, on the other hand, such layer may be provided in any of photographic elements including an image-receiving element, processing sheet and light-sensitive element. For instance, the present polymer mordant or its solution may be coated to form a layer between a light-sensitive layer (a silver halide emulsion layer) and a support therefor or between the light-sensitive layer and an image-receiving layer in the manner as disclosed in U.S. Pat. Nos. 3,415,644, 3,473,925, 3,573,043, 3,573,042 and 3,615,421. Alternatively, the present polymer mordant or its solution may be incorporated into the aforementioned intermediate layer or neutralization layer so that the resulting layer may be used as a scavenger layer. Further, a layer containing the present polymer mordant may be used in a processing sheet as a scavenger layer when layers of the photographic elements are constructed according to the manner disclosed in U.S. Pat. Nos. 3,415,645, 3,415,646, 3,594,164 and 3,594,165.

The present polymer mordant is capable of self-curing to form a film capable of acting as a mordant and can form a film capable of acting as a mordant even when used in combination with other binders. Usable binders, though not critical, may include, for example, gelatin, polyvinyl alcohol, carboxymethyl cellulose, hydroxyethyl cellulose, starch, polyacrylamide, and polyvinylpyrrolidone which are all water-soluble polymers. When these polymers are used in combination with the present polymer mordant, they may be mixed together in any proportions. In case the present polymer mordant is incorporated into an image-receiving layer, however, the amount of the present polymer mordant contained in the image-receiving layer is preferably within the range of 10 to 100% by weight, and the present polymer mordant is desirably used in the above-mentioned proportion when it is incorporated into a scavenger layer as well as other layers which is capable of acting as a mordant.

A thickness of a layer containing the present polymer mordant may be varied widely according to the object, for example, when the layer is an image-receiving layer, the optimum thickness of the layer is about 3 to 10 microns, and said layer is a scavenger layer, the thickness of the scavenger layer is desirably 0.5 to 10 microns.

In the present invention, there may be used a processing sheet according to the layer-construction of the photographic elements. The processing sheet used may be any of those which aim at shading and/or at a homogenous distribution of a processing agent to effect diffusion favorably. In the former case, there may be used such sheets as capable of shading, while in the latter case the sheets used may be those which are capable of effecting a homogeneous distribution and diffusion, irrespectively said sheets may be either transparent or opaque. When said processing sheet is provided with a scavenger layer, a layer containing the present polymer mordant may be coated on a support for the processing sheet and, on the other hand, when the processing sheet has been provided with a neutralization layer and/or an intermediate layer, the present polymer mordant may be incorporated into said layer and the resulting layer may be used as a scavenger layer. Supports for the processing sheet may be any materials similar to those used for the image-receiving element as aforesaid, according to the object. The case of processing sheets used for shading purposes, such pigments as carbon black and titanium oxide may be incorporated into a support for the processing sheet and, if necessary, such pigments may be coated on the support by the aid of a binder.

The above-mentioned image-receiving element is located face to face with the exposed light-sensitive element for color diffusion transfer photography, a processing agent (an alkaline processing solution) is spread there between to develop a silver halide emulsion, and the resulting dye image forming substance is transferred to an image-receiving layer of said image-receiving element, thereby to obtain a color image.

The light-sensitive element for color diffusion transfer comprises on a support at least one layer of a silver halide emulsion and a dye image forming substance used in combination with a silver halide of this silver halide emulsion layer. Particularly, the said support is desirably coated successively on the surface with a red-sensitive emulsion layer, a green-sensitive emulsion layer and a blue-sensitive emulsion layer, said emulsion layers respectively containing a cyan dye image forming substance, a magenta dye image forming substance and a yellow dye image forming substance. If necessary, the said support may be provided with such layers as a yellow filter layer, antihalation layer, intermediate layer and protective layer. The above-mentioned support is desirably a sheet-like material having a plane surface which is free from a marked dimentional change caused by a processing composition during a treatment. According to the object, such hard support as glass plate may be used, but flexible supports are generally useful. As flexible supports, there may be advantageously used such supports as commonly used in light-sensitive photographic materials, for example, cellulose nitrate film, cellulose acetate film, polyvinyl acetal film, polystyrene film, polyethylene terephthalate film and polycarbonate film. In the present invention, such water vapor permeable support as disclosed in U.S. Pat. Nos. 3,573,044 and 3,690,879 is advantageously used in order to aid evaporation, through the support after a treatment, of a water solution of the processing agent (an alkaline processing solution) which has been spread during the treatment. Further, a transparent support used in the light-sensitive element is desirably colored to such an extent that imagewise exposure and observation are not hindered but permeation of light in the direction of plane can be prevented in order to prevent permeation of light from end portions of the support into a silver halide layer. If desired, the support may contain various photographic additives, for example, such plasticizers as phosphates and phthalates, such ultraviolet absorbers as 2-(2-hydroxy-4-t-butylphenyl)benztriazole and such antioxidants as hindered phenol. In order to maintain adhesion between a support and a layer containing a hydrophilic polymer, it is advantageous to provide the support with a sub layer or subject the support on the surface to pre-treatment such as corona discharge, ultraviolet irradiation or fire flame treatment. A thickness of a support is not critical, but usually the support desirably has a thickness of 20 to 300 microns. When used for shading purposes, the support may be incorporated, for example, with such pigments as carbon black and titanium oxide, or such pigments may be coated by the aid of a binder on the support.

A process for forming dye images adopted in the color diffusion transfer method of the present invention may vary depending on the mode through which a dye image forming substance releases a diffusible dye as a result of development of a silver halide. The dye image forming substance may already contain a complete chromophore moiety or may form a chromophore moiety during development and a step subsequent thereto, which step occurs simultaneously therewith. Further, a component indispensable for the formation of dye may be allowed to move in an image-receiving layer to form the dye therein. Of the processes involving conversion of a dye image forming substance starting from development into a diffusible dye, typical three processes advantageously applicable to the present invention are explained hereinafter. The first typical process is a so-called dye developer process. A dye developer used in this process is a compound comprising both a chromophore system and a silver halide developing group in one molecule. As a result of oxidation, by a silver halide, of a dye developer as a dye image forming substance, there occur reduction of the silver halide and oxidation of the dye developer, whereby the oxidized dye developer undergoes a change in diffusibility in the processing composition. The oxidized dye developer, compared with the reduced form of said dye developer, has a low solubility and a low diffusibility in the processing agent and is fixed in the vicinity of the reduced silver halide. Preferably, the developer is substantially insoluble in an acidic or neutral aqueous medium and has at least one radical capable of dissociation sufficient to render the type developer soluble and diffusible in the alkaline processing agent. Such dye developer may be incorporated into a light-sensitive element, particularly a silver halide emulsion layer or a layer or layers adjacent thereto, and is used in a light-sensitive element comprising a combination of a silver halide emulsion and a dye developer having spectral absorption characteristics corresponding to photosensitive wavelength region of the silver halide emulsion. When diffusion transfer is effected, starting from a light-sensitive element having at least one unit of the above-mentioned photosensitive combination to an image-receiving element, a mono color or multicolor positive transferred image may be obtained by development treatment in one step. More particularly, in the color diffusion transfer method using such typical first process, a silver halide latent image in a light-sensitive element is developed in the presence of a dye developer and, as the result of this development, the dye developer present in the exposure region is oxidized and substantially fixed. At least, such fixation is considered ascribable partly to the change in solubility characteristics of the dye developer at the time of oxidation thereof, particularly to the change in solubility in the alkaline solution. In the unexposed and partly exposed regions of the emulsion, the dye developer may be diffusible in an unreacted state, and hence provides a imagewise distribution of the unoxidized dye developer in the processing agent as a function of the degree of exposure by point of a silver halide emulsion. At least a part of the imagewise distribution of the unoxidized dye developer is transferred by inhibition to an image receiving layer located face to face therewith. This transfer substantially exclude the oxidized dye developer. The image-receiving element receives imagewise diffusion of the unoxidized dye developer from the developed emulsion without substantially disturbing the imagewise distribution of the unoxidized dye developer, thereby to give a reversal image of the developed image. The diffusion transfer method relying on this first typical process is illustrated in many patents, for example, British Pat. No. 804,971 and so on.

In the present invention, particularly useful dye developers are such compounds as having a benzenoid group as the silver halide developing group, and preferable benzenoid group in the compounds is a hydroquinonyl group. Typical dye developers are those disclosed, for example, in U.S. Pat. Nos. 2,983,606, 3,345,163, 3,255,001, 3,218,164, 3,453,107, 3,551,406, 3,135,605, 3,421,892, 3,597,200, 3,563,739, 3,482,972, 3,415,644 and 3,594,165. In the present invention, there may be used a hydrolizable dye developer having introduced therein a hydrolyzable group and a shorter wavelength shift dye developer. Typical examples of such dye developers are compounds disclosed in U.S. Pat. Nos. 3,230,082, 3,329,670, 3,307,947, 3,230,083, 3,230,084, 3,230,085, 3,579,334, 3,295,973, 3,196,014 and 3,336,287, Japanese Patent Publications Nos. 379/1961, 12393/1961 and 2241/1962, U.S. Pat. Nos. 3,312,682 and 3,826,801. In the present invention, moreover, there may be used a leuco dye developer in which a chromophre moiety is reduced to a colorless leuco body temporarily. Typical examples of such leuco dye developers are such compounds disclosed in U.S. Pat. Nos. 2,909,430, 3,320,063, 2,892,710 and 2,992,105, Japanese Laid-Open-to-Public Patent Publications Nos. 66440/1973 and 66441/1973.

The typical second process is a process in which a product oxidized with a silver halide reacts with a dye image forming substance to release a diffusible dye. More particularly, this process is classified into A type, B type and C type. In the process of A type, a reactive non-diffusible substance capable of coupling with the oxidized developing agent and, as the result of coupling, a soluble and diffusible dye can be liberated and purged into the processing agent. The diffusible dye releasing coupler of this type includes a moiety substituted by a radical liberated by the developing agent, of which the point of coupling reaction has been oxidized. An electron congugate system of the dye to be released may be previously incorporated into the coupler or may be formed by the coupling reaction. The former coupler shows a spectral absorption close to that of the dye to be released. Contrary thereto, the latter coupler is fundamentally colorless, and even in the case of a colored coupler, absorption thereof has nothing to do directly with the absorption of the dye to be release, and is temporary. The compounds used in the above-mentioned process of A type are disclosed in U.S. Pat. Nos. 3,227,550, 3,880,658 and 3,765,886, British Patents 840,731, 904,364, 904,365 and 1,038,331.

The process of B type is a process in which as the result of an intramolecular ring closing reaction with a substituent at the point adjacent to the reaction point of the condensation reaction with the oxidized developing agent, which ring closing reaction takes place subsequent to the condensation reaction, a dye residue contained in the substituent is cleave and released. Particularly, after oxidation coupling of an aromatic primary amino developing agent to the 4-position of phenol or aniline, azine ring is formed with a sulfonamide group containing a chromophore moiety located at the 3-position, thereby to release a diffusible dye having a sulfinic acid moiety. The compounds used in the process of B type are disclosed in U.S. Pat. Nos. 3,443,940 and 3,734,726. In the process of C type, as a result of development, by the aid of the oxidized auxiary agent, the dye developer release a diffusible dye on ring closure by oxidation or on decomposition with alkali. In the formation of dye image, of the kind, a dye image forming substance is oxidized via such auxiary agents as hydroquinones and 3-pyrazolones. Typical examples of the dye image forming substance of this type are disclosed in U.S. Pat. Nos. 3,725,062, 3,698,897, 3,728,113, 3,443,939, 3,443,940, 3,245,789 and 3,880,658, Belgian Pat. Nos. 796,041 and 796,042, Japanese Laid-Open-to-Public Publications Nos. 33826/1973 and 114424/1974.

In the typical third process, a dye image forming substance is used, which substance release a diffusible dye on cleavage with alkali, but no substantial cleavage takes place in the presence of the oxidized developer. Typical examples of the dye image forming substance are disclosed in Japanese Laid-Open-to-Public Publication No. 111628/1974.

In each of the above-mentioned typical first and third processes, a negative type silver halide emulsion layer used is subjected to development to give a positive diffusion transfer dye image. Contrary thereto, in the typical second process, a negative type silver halide emulsion layer used is subjected to development to give a negative diffusion transfer dye image. For that account, the typical second process requires a reversal method. For instance, there may used direct positive type emulsions, namely, such internal latent image type emulsions as disclosed in U.S. Pat. Nos. 2,592,550, 2,588,982 and 3,227,552, and such fogged emulsions type as disclosed in British Pat. Nos. 443,245 and 462,730, U.S. Pat. Nos. 2,005,837, 2,541,472 and 3,367,778. Furthermore, a layer containing a diffusible dye releasing coupler and a physical developing nucleus, which layer has been formed adjacent to the negative silver halide emulsion layer, may be processed with a developer solution containing a silver halide developing agent, and a concrete example of this process is disclosed in U.S. Pat. Nos. 3,243,294 and 3,630,731. Further, a layer containing a diffusible dye releasing coupler and a spontaneously reducible metal salt may be formed, which layer is adjacent to a negative silver halide emulsion layer containing a compound releasing a development inhibitor such as 1-phenyl-5-mercaptotetrazole on reaction with an oxidation product of the developing agent. Typical examples of this process are disclosed in U.S. Pat. Nos. 3,148,062, 3,227,551, 3,227,554, 3,364,022 and 3,701,783, Japanese Patent Publications Nos. 21778/1968 and 49611/1972. In the present invention, such combinations of these emulsions and dye image forming substances, and it is optional to select a process for giving negative or a positive dye image.

The dye image forming substance used in the present invention may be dispersed in a silver halide emulsion layer or a hydrophilic protective colloid, which is a carrier for a layer adjacent to the silver halide emulsion layer, in various manners according to the type of dye image forming substance used. For instance, a dye image forming substance having such dissociative group as a sulfo or carboxyl group may be first dissolved in water or an aqueous alkaline solution and the resulting solution is dispersed in a hydrophilic protective colloid solution. A dye image forming substance which is difficultly soluble in aqueous media but easily soluble in organic solvents may be first dissolved in an organic solvent and the resulting solution is then dispersed with stirring in a hydrophilic protective colloid solution to form a dispersion of fine particles of the substance. As the organic solvent referred to above, there may be used a high boiling solvent alone or a low boiling solvent removable by evaporation from the dispersion containing the same or an organic solvent easily soluble in water in combination with said high boiling solvent. For instance, a process disclosed in Japanese Patent Publication No. 13837/1968 may be effectively usable in the present invention for dispersing the dye image forming substance. Particularly useful as high boiling solvents in the present invention, are N-n-butylacetanilide, diethyllaurylamide, dibutyllaurylamide, dibutylphthalate, tricresyl phosphate, triglicerides of higher fatty acids and dioctyl adipate. Usable low boiling solvents include ethyl acetate, methyl acetate, 4-methylcyclohexanone, tetrahydrofuran and methyl ethyl ketone. Further, the dye image forming substance may be dispersed in the hydrophilic protective colloid solution in the presence of such sulfites as disclosed in U.S. Pat. No. 3,287,133 in order to attain a stabilized dispersion. Further, the dye image forming substance used in the present invention may be dispersed in the form of fine particle directly in a hydrophilic protective colloid without using a high boilling solvent or the like in the manner as disclosed in Japanese Patent Publication No. 32131/1973 and U.S. Pat. No. 3,832,173. The amount of the dye image forming substance used in the present invention may be widely varied according to the kind of the compound used and the desired result. However, the amount of the said substance is preferably about 0.5 to about 10% by weight based on the hydrophilic protective colloid coating solution containing the same.

In case a multi-color photography is practiced in the present invention, an intermediate layer is advantageously used in a light-sensitive element. This intermediate layer prevents an undesirable interaction among unit emulsions having different color sensitivities and, at the same time, the dye image forming substance controls diffusibility of the alkaline processing composition. This intermediate layer may be usefully composed of gelatin, calcium alginate, or any material disclosed in U.S. Pat. No. 3,384,483, vinyl acetate/crotonic acid copolymers, isopropyl cellulose and hydroxypropyl methylcellulose disclosed in Japanese Patent Publication No. 18435/1970, polyvinylamides disclosed in Japanese Patent Publication No. 47606/1972, polyvinyl amide graft copolymers disclosed in U.S. Pat. No. 3,575,700, and system of latex liquid and permeating agents disclosed in Japanese Patent Publication No. 20972/1974 and U.S. Pat. No. 3,756,816. This intermediate layer may contain a interlayer interaction inhibiting agent which is selected according to the type of the dye image forming substance and the processing agent used. For instance, in the case of a dye image forming substance of the type releasing a diffusible dye by the action of an oxidation product of the developing agent, such reducing agent as non-diffusible hydroquinone derivative and a non-diffusible coupler capable of bein-fixed on reaction with the oxidation product are effective in preventing undesirable exchange of the oxidation product of the developing agent between unit emulsion layers.

The silver halide emulsion used in the present invention is composed of a colloidal dispersion of silver chloride, silver bromide, silver chlorobromide, silver iodobromide, silver chloroiodobromide or mixtures thereof. This silver halide emulsion may comprise either fine or coarse particles of silver halide, and the particles having an average of from about 0.1 micron to about 2 microns in size are useful. Further, this silver halide emulsion may be prepared by any of known procedures, and includes, for example, a single jet emulsion, double jet emulsion, Lippman emulsion, ammoniacal emulsion, thioether ripened emulsion, and such emulsions as disclosed in U.S. Pat. Nos. 2,222,264, 3,320,069 and 3,271,157. Also, emulsions containing silver halide particles having substantial surface light-sensitivity may be used, and these emulsions are disclosed in U.S. Pat. Nos. 2,592,250, 3,206,313 and 3,447,927. In the present invention, there may be used negative type emulsions or such direct positive emulsions as disclosed in U.S. Pat. Nos. 2,184,013, 2,541,472 and 3,367,778, British Pat. No. 723,019, French Pat. No. 1,520,821, U.S. Pat. Nos. 2,563,785, 2,456,953 and 2,861,885.

The silver halide emulsions used in the present invention may be sensitized by means of natural sensitizers or chemical sensitizers, for example, reducing agents, sulfur, selenium or tellurium compounds, gold, platinum or palladium compounds or combinations of these. Sitable sensitization procedures are disclosed in U.S. Pat. Nos. 1,623,499, 2,399,083 3,297,447 and 3,297,446.

The silver halide emulsions used in the present invention may be incorporated with speed increasing compounds, for example, polyalkylene glycol, cation type surface active agent and thioether or combinations thereof, or compounds disclosed, for example, in U.S. Pat. Nos. 2,886,437, 3,046,132, 2,944,900 and 3,294,540. The silver halide emulsions used in the present invention may be protected from formation of fog and stabilized to prevent a drop in sensitivity during storage. Suitable antiffogants and stabilizers, which may be used either singly or in combination, include thiazolium salts disclosed in U.S. Pat. Nos. 2,131,083 and 2,694,716; azaindenes disclosed in U.S. Pat. Nos. 2,886,437 and 2,444,605; mercury salts disclosed in U.S. Pat. No. 2,728,663; urazoles disclosed in U.S. Pat. No. 3,287,135; sulfocatechol disclosed in U.S. Pat. No. 3,236,652; oxims, nitrons and nitroindazoles disclosed in British Pat. No 623,448; mercaptotetrazoles disclosed in U.S. Pat. No. 2,403,927, mercaptotetrazoles disclosed in U.S. Pat. Nos. 3,266,897 and 3,397,987; polyvalent metal salts disclosed in U.S. Pat. No. 2,839,405; thiuronium salts disclosed in U.S. Pat. No. 3,220,839; and platinum and gold salts disclosed in U.S. Pat. Nos. 2,566,263 and 2,597,915.

The silver halide emulsion layer, layer containing a dye image forming substance, layer containing a mordant and processing agent permeating layers such as protective layer or intermediate layer used in the present invention desirably contain a hydrophilic polymer as a binder. The hydrophilic polymer includes, for example, gelatin, gelatin modified by means of acylating agents or the like, vinyl polymer-grafted gelatin, protein such as casein and albumin, cellulose derivatives such as hydroxyethylcellulose, hydroxypropylcellulose, methylcellulose and carboxymethylcellulose, partial hydrollzates of polyvinyl alcohol or polyvinyl acetate, polyvinyl ethers, e.g. such high molecular non-electrilytes as polymethylvinyl ether, acrylic acid, partial hydrolyzates of polyacrylamide, and anionic synthetic polymers such as copolymers of vinylmethyl ether and maleic acid. These hydrophilic polymers may be used either singly or in combination thereof. Further, these hydrophilic polymer layers may contain dispersions of latexlike polymers of hydrophobic monomers such as alkyl acrylates and alkyl methacrylates. In the present invention, the above-mentioned hydrophilic polymers, particularly those having functional groups such as amino, hydroxyl and carboxyl may be rendered insoluble by means of various hardening agents without losing processing agent permeating property. Particularly useful hardening agents include aldehydes such as formaldehyde, glyoxal and glutalydehyde, N-methylol compounds such as N-hydroxymethylphthalamide and 1-hydroxymethylbenzotriazole, ketones such as 2,5-hexadione and 1,2-cyclopentadione, methylol compounds such as hexamethylolmelamine, epoxy compounds such as 1,4-bis(2,3-epoxypropoxy)diethyl ether, azilidine compounds such as triethylenephosphamide, and high molecular compounds such as 3-hydroxy-5-chloro-8-triazinylated gelatin. Further, these hydrophilic polymer layers may contain such hardening promotors as carbonates and resorcinol in addition to the above-mentioned hardening agent.

The silver halide emulsions used in the present invention may also be optically sensitized by means of optical sensitizing dyes. For instance, the silver halide emulsion may be optically sensitized by treating said emulsion with an organic solvent solution of a sensitizing dye, or by incorporating a liquid dispersion of the dye into the emulsion in the manner as described in British Pat. No. 1,154,781. In order to obtain the optimum results, the dye is desirably incorporated into the emulsion in the course of the final step, or a step prior thereto, of preparing said emulsion. Such sensitizing dyes useful for sensitization of the silver halide emulsions are described, for example, in U.S. Pat. Nos. 2,526,632, 2,503,776, 2,493,748 and 3,384,486. The optical sensitizers effectively usable in the present invention include cyanines, merocyanines, stylyls, hemicyanines (e.g. enaminehemicyanine), oxonols and hemioxonols. Cyanine dyes desirably contain such basic nuclei as thiazolin, oxazolin, pyrrolin, pyridine, oxazol, thiazol, selenazol and imidazole. Such nuclei may contain such group as alkyl, alkylene, hydroxyalkyl, sulfoalkyl, carboxyalkyl, aminoalkyl or enamine, and may be attracted to carbocyclic ring or heterocyclic ring, which rings may be substituted or unsubstituted by a halogen atom, phenyl, alkyl, haloalkyl cyano or alkoxy. These dyes may have alkyl, phenyl, enamine or heterocyclic substituent in a symetric or asymetric form on a methylene or polymethine chain. Merocyanine dyes contain the above-mentioned basic nuclei and such acidic nuclei as thiohydantoin, rhodanine, oxazolidenedione, thiazolidenedione, barbituric acid, thiazolinone and malononitrile. This acidic nuclei may be substituted by alkyl, alkylene, phenyl, carboxyalkyl, sulfoalkyl, hydroxyalkyl, alkoxyalkyl, alkylamino or heterocyclic nucleus. If desired, the above-mentioned dyes may be used in combination. In the present invention, if desired, the silver halide emulsion may contain supersensitizing additives which do not absorb visible light, for example, ascorbic acid derivatives, azaindenes, cadmium salts, or organic sulfonic acids as described in U.S. Pat. Nos. 2,933,390 and 2,937,089.

The processing agent (an alkaline processing solution) used in the present invention may be any of liquid compositions so long as they contain processing components necessary for development of a silver halide emulsion and formation of a diffusion transfer image. As solvents for this processing agent, there may be used optionally water, and such hydrophilic solvents as methanol, methylcelosolve. The processing agent desirably contains an alkali agent in an amount sufficient to maintain pH necessary for initiating development of the emulsion layer and neutralizing acids formed during steps of development and formation of dye images. Usable as the alkali agents, are sodium hydroxide, potassium hydroxide, calcium hydroxide, tetramethyl ammonium hydroxide, sodium carbonate, sodium phosphate and diethylamine. The processing agent desirably has a pH value of about 12 or higher at room temperature. The processing agent used in the present invention may be incorporated with viscosity-increasing agents, for example, high molecular viscosity-increasing agents inactive to alkaline solutions, such as hydroxyethylcellulose and sodium carboxymethyl-cellulose. The concentration of viscosity-increasing agent is desirably 1 to 5% by weight based on the processing agent, and by the use of such agent the processing agent may be imparted with a viscosity of about 100 to 200,000 cp, and not only the agent facilitate uniform spreading of the processing agent at the time of treatment but also forms a non-fluid membrane, when an aqueous solvent moves in the light-sensitive element and the image-receiving element during treatment to cause concentration of the processing agent, to help unification of the photographic elements after the processing. After substantial completion of the formation of a diffusion transfer image, this polymer membrane may be serviciable for inhibiting a further transfer of the image forming component from the light-sensitive element to the image-receiving element, thereby to prevent the formed image from being changed. In some cases, the processing agent advantageously contains such light absorbing substance as carbon black in order to prevent a silver halide emulsion from fogging due to external light during processing. Further, the processing agent contains treatment components inherently necessary for an image forming substance. In the case of the dye developer, for example, the developer is desirably incorporated with such auxiary developing agents such as paraaminophenol, 4'-methylphenyl hydroquinone and 1-phenyl-3-prazolone, such onium type development promotors such as N-benzyl-α-picolinium bromide, and such antiffogants as benzotriazole. In the case of the diffusible dye releasing coupler, the processing agent is desirably incorporated with such developing agent as an aromatic primary amino color developing agent, such antioxidant as sulfite or ascorbic acid, antiffogant such as halides or 5-nitrobenzimidazole, and such silver halide dissolving agent as sodium thiosulfate or sodium thiocyanate.

In the color diffusion transfer method according to the present invention, the development treatment may be carried out in the presence of a diffusible onium compound. Such onium compound includes quaternary ammonium compounds, quaternary phosphoric acid compounds or quaternary sulfonium compounds. Particularly useful as onium compounds in the present invention, for example, are 1-benzyl-2-picolinium bromide, 1-(3-bromopropyl)-2-picolinium-p-toluenesulfonic acid, 1-phenetyl-2-picolinium bromide, 2,4-dimethyl-1-phenethylpyridinium bromide, α-picolin-β-naphthtoylmethyl bromide, N,N'-diethylpiperidinum bromide, phenethyltrimethylphosphonium bromide and dodecyldimethylsulfonium-p-toluenesulfonium. The onium compounds are desirably incorporated into the processing agent (an alkaline processing solution), though they may be incorporated into either the light-sensitive element or the image-receiving element. Concrete examples of the onium compounds and method of use thereof are described, for example, in U.S. Pat. Nos. 3,411,904 and 3,173,786.

In the present invention, light reflection substances may be used in order to form a white background of the image formed on the image-receiving layer. Suitable light reflection substances include titanium dioxide, barium sulfate, zinc oxide, barium alumina stearate, calcium carbonate, silicate, zirconium oxide, kaolin and magnesium oxide. These substances may be used either singly or in admixtures thereof. These substances may be those which have previously been prepared, or may be formed at a given location from precursors thereof which have been distributed in the photographic element in the manner as described in Belgian Pat. Nos. 768,110 and 768,111. Further these light reflection substances may be incorporated into a layer of hydrophilic materials such as polyvinyl alcohol, gelatin, hydroxypropylcellulose and polyvinylpyrrolidone, or a layer comprising as a binder a vinyl polymer containing an anionic solubilized group as disclosed in U.S. Pat. No. 3,721,555. Further, these substances may be previously incorporated into the processing agent and then fixed in a dispersion state in a layer of membrane-forming polymer such as hydroxyethylcellulose or carboxymethyl-cellulose, said layer has been formed during treatment with the processing agent. In combination with such light reflection substances, there may be used fluorescent brightening agents such as stylben, cumarin, triazine or oxazol. In the present invention, moreover, there may be used during treatment such indicator dyes as disclosed in Belgian Pat. Nos. 743,336 and 768,107, together with the light reflection substances, in order to protect a silver halide emulsion from surrounding light.

The processing agent (an alkaline processing solution) used in the present invention is desirable enclosed into a rupturable vessel. For instance, the processing agent is desirably enclosed in an envelope-like vessel made of liquid and air-tight material and the vessel is then sealed so that when the photographic element passes through a pressure applying instrument, the vessel ruptures by an internal pressure applied thereto at a given location and the processing solution is released from the vessel to spread. As the material for preparing the abovementioned vessel, there may be advantageously used a laminate of polyethylene terephthalate/-polyvinyl alcohol/polyethylene and laminate of lead foil/vinyl chloride-vinyl acetate copolymer. Further, this vessel is desirably fixed at the front edge of the photographic element so that the enclosed processing solution spreads substantially in one direction on the surface of the light-sensitive element. Preferable examples of such vessel are disclosed in U.S. Pat. Nos. 2,543,181, 2,643,886, 2,653,732, 2,723,051, 3,056,491, 3,056,492, 3,152,515 and 3,173,580.

The image-receiving element used in the present invention desirably comprises as a surface layer a hydrophilic colloid. As the hydrophilic colloid, there may be desirably used, for example, gelatin, starch, dextrin, polyvinyl pyrrolidone, gum arabic carboxymethylcellulose, hydroxyethylcellulose, polyvinyl alcohol gual gum and gum acacia.

In the present invention, a peeling agent may be used when an formed image is obtained by peeling off the light-sensitive element from the image-receiving element. The peeling agent may be incorporated into the surface of the silver halide emulsion layer or of the image-receiving element containing a mordant, or into the processing agent. Suitable peeling agents used have the composition different from that of the binder used in the silver halide emulsion layer. For instance, useful peeling agents include alkali-permeable polysaccharides, carboxymethylcellulose, hydroxyethylcellulose, hydroxypropylcellulose, 4,4'-dihydroxyphenol, glucose, cane sugar, sobitol, inositol, resorcinol, sodium phytininate, zinc oxide, particulate polyethylene, particulate tetrafluorinated polyethylene, polyvinylpyrrolidone/polyvinyl hydrogen phthalate as disclosed in U.S. Pat. No. 3,325,283, and ethylene-maleic anhydride as disclosed in U.S. Pat. No. 3,376,137. Further, such hydrophilic colloid surface layer formed on the image-receiving element may be incorporated with ultraviolet absorbers, for example, such compounds as disclosed in U.S. Pat. Nos. 3,460,942, 3,069,262, 3,330,680 and 3,330,656. If desired, such surface layer may be incorporated with fluorescent brightening agents such as stylben, cumarin, triazine and oxazol.

The layers of the photographic elements such as the light-sensitive element, image-receiving element and processing sheet may be incorporated, if necessary, with surface active agent, for example, saponin, anionic compounds, for example, alkylarylsulfonates as disclosed in U.S. Pat. No. 2,600,831, amphoteric compounds, for example, those as disclosed in U.S. Pat. No. 3,133,816, and water-soluble addacts of glycidol and alkylphenol disclosed in British Pat. No. 1,022,878. Further, in order to facilitate coating operation of layers of the photographic elements, the coating compositions may be incorporated with various kinds of viscosity-increasing agents and the aforementioned surface active agents. For example, anionic polymers showing viscosity-increasing action by the interaction with a binder polymer in the coating composition, such as high molecular weight polyacrylamide or acrylic polymer, are also advantageously usable in the present invention.

The photographic element layers used in the present invention may be formed according to such coating techniques as immersion coating, air-knife or curtain coating, or extrusion coating using a hopper as disclosed in U.S. Pat. No. 2,681,294. If desired, two or more layers may be simultaneously formed according to coating techniques disclosed in U.S. Pat. No. 2,761,791 and British Pat. No. 837,095. The present invention may also applicable to vacuum evaporated silver halide layers in the manner as described in British Pat. No. 968,453 and U.S. Pat. No. 3,219,451.

The photographic element layers used in the present invention may be hardened with various kinds of organic or inorganic hardening agents used either singly or in combination. Suitable hardening agents include, for example, aldehydes, blocked aldehydes, ketones, carboxylic acid derivatives, carbonic acid derivatives, sulfonates, sulfonylhalides, vinylsulfonyl ethers, activated halogen compounds, epoxy compounds, azilidines, activated olefins, mixed functional hardening agents and polymer hardener, for example, oxidized polysaccharides such as dialdehyde starch and oxygual gum.

The sensitizing dyes and other additives may be used in the form of aqueous solution, or after dissolving the same in suitable organic solvents. The above-mentioned sensitizing dyes and other additives may be incorporated into the photographic elements according to various procedures as described in U.S. Pat. Nos. 2,912,343, 3,342,605, 2,996,287 and 3,425,835.

The photographic element layers used in the present invention may contain, for example, such light absorbing substance and filter dyes as disclosed in U.S. Pat. Nos. 3,253,921, 2,274,782, 2,527,583 and 2,956,879. If desired, such compounds may act as a mordant as disclosed in U.S. Pat. No. 3,282,699.

The present invention is illustrated below more concretely with reference to examples, but embodiments of the invention are not limited only thereto.

EXAMPLE 1

A light-sensitive element was prepared by successively coating in the following order an acetylcellulose film support on the gelatin-subbed surface with each of the layers mentioned below.

(1) Cyan dye developing agent containing layer

A solution of 1,4-bis($\alpha$-methyl-$\beta$-hydroquinonylethylamino)-5,8-dihydroxyanthraquinone in a mixture comprising N-n-butylacetanilide and 4-methylcyclohexanone was dispersed in an aqueous gelatin dispersion containing a dispersing agent Alkanol B (produced and sold by Du Pont Co.) to prepare an emulsion. The emulsion was then coated on the film support so that the amount of gelatin became 4.2 g/m$^2$ and that of the cyan dye developing agent became 2.0 g/m$^2$.

(2) Red-sensitive emulsion layer

A red-sensitive silver iodobromide emulsion was coated on the layer (1) so that the amount of silver became 0.6 g/m$^2$ and that of gelatin became 2.4 g/m$^2$.

(3) Intermediate layer

On the layer (2) was coated gelatin in a proportion of 2.0 g/m$^2$.

(4) Magenta dye developing agent containing layer

A solution of 2-[p-($\beta$-hydroquinonylethyl)phenylazo]-4-n-propoxy-1-naphthol in a mixture comprising N-n-butylacetanide and 4-methylcyclohexanone was dispersed in an aqueous gelatin solution containing a dispersing agent Alkanol B to prepare an emulsion. The emulsion was coated on the layer (3) so that the amount of gelatin became 2.8 g/m$^2$ and that of the magenta dye developing agent became 1.3 g/m$^2$.

(5) Green-sensitive emulsion layer

A green-sensitive silver iodobromide emulsion was coated on the layer (4) so that the amount of silver became 1.2 g/m$^2$ and that of gelatin became 1.2 g/m$^2$.

(6) Intermediate layer

On the layer (5) was coated gelatin in a proportion of 1.5 g/m$^2$.

(7) Yellow dye developing agent containing layer

A solution of 1-phenyl-3-N-n-hexylcarbamoyl-4-[(p-2',5'-dihydroxyphenethyl)phenylazo]-5-pyrazolone in a mixture comprising N,N-diethyllaurylamide and ethyl acetate was dispersed in an aqueous gelatin solution containing a dispersing agent Alkanol B to prepare an emulsion. The emulsion was coated on the layer (6) so that the amount of gelatin became 1.1 g/m$^2$ and that of the yellow dye developing agent became 0.5 g/m$^2$.

(8) Blue-sensitive emulsion layer

A blue-sensitive silver iodobromide emulsion was coated on the layer (7) so that the amount of silver became 0.6 g/m$^2$ and that of gelatin became 0.6 g/m$^2$.

(9) Protective layer

A solution of 4'-methylphenylhydroquinone in N,N-diethyllaurylamide was dispersed in an aqueous gelatin solution to prepare a coating emulsion. The coating emulsion was then charged with 5 ml of a 2% aqueous mucochloric acid solution per 100 ml of said coating emulsion and then coated on the layer (8) so that the amount of 4'-methylphenylhydroquinone became 0.5 g/m² and that of gelatin became 0.6 g/m².

A processing agent (an alkaline processing solution) was prepared according to the following composition:

| Water | 100 ml |
|---|---|
| Potassium hydroxide | 11.2 g |
| Carboxymethylcellulose | 5 g |
| Benzotriazole | 7.0 g |
| N-Phenethyl-α-picoliniumbromide | 2.0 g |
| Benzylaminopurine | 0.12 g |
| Titanium dioxide | 50 g |

The above-mentioned processing composition is packed and placed between the aforementioned light-sensitive element and an image-receiving element having an image-receiving layer incorporated with each of a variety of polymer mordants (comparative compounds and the compounds of the present invention) shown in the following Table 1 to form an assembly. The assembly was imagewise exposed and then subjected to development processing using a roller pressure instrument. The photographic element thus obtained was measured in maximum density ($D_{max}$), after the lapse of 10 minutes from completion of the processing, of cyan (C), of magenta (M) and of yellow (Y) using red, green and blue filters to obtain the results as shown in Table 1.

The image-receiving element was prepared by coating on a transparent polyethylene terephthalate film base of 100μ thick 100 g of an aqueous solution containing 3% by weight of a polymer mordant of the present invention (the aforesaid exemplified compound) and 6% by weight of polyvinyl alcohol (Gosenol NH-26, produced and sold by Nippon Gosei Kagaku Kogyo K.K.), which aqueous solution had been incorporated with 0.1 g of polyoxyethylenenonylphenyl ether, so that an image-receiving layer having a dry thickness of 5μ was formed on the film base.

Table 1

| Image-receiving element | Exemplified compound | $D_{max}$ Y | M | C |
|---|---|---|---|---|
| (1) | | 1.18 | 1.28 | 1.25 |
| (2) | | 1.23 | 1.27 | 1.31 |
| (3) | (2) | 1.46 | 1.58 | 1.73 |
| (4) | (3) | 1.51 | 1.63 | 1.81 |
| (5) | (6) | 1.43 | 1.56 | 1.62 |
| (6) | (8) | 1.62 | 1.61 | 1.83 |
| (7) | (9) | 1.59 | 1.62 | 1.79 |
| (8) | (12) | 1.48 | 1.57 | 1.66 |

In the above table, image-receiving element (1) is an illustrative one with a known polymer mordant poly-4-vinylpyridine and the image-receiving element (2) is the case with a polymer mordant obtained by grafting 2 mole% of 4-vinylpyridine on poly-4-vinylpyridine.

From the results in Table 1, it is understood that both image-receiving element (1) containing the known polymer mordant and image-receiving element (2) containing the polymer mordant prepared by grafting 2 mole% of 4-vinylpyridine on poly-4-vinylpyridine are low in $D_{max}$, whereas image-receiving elements (3)–(8) individually containing the present polymer mordant is high in $D_{max}$.

EXAMPLE 2

A light-sensitive element was prepared by successively coating in the following order an acetylcellulose film support on the gelatin-subbed surface with each of the layers mentioned below:

(1) A coating liquid comprising a green-sensitive silver bromide, gelatin and a magenta dye-diffusing coupler 1-phenyl-3-(3,5-disulfobenzamido)-4-(6-hydroxy-4-pentadecyl-phenylazo)-5-pyrazolone potassium neutral salt was coated on the film support so that the amount of silver became 1.0 g/m², that of gelatin 2.6 g/m² and that of the magenta dye-diffusing coupler 0.8 g/m².

(2) Gelatin was coated on the layer (1) in a proportion of 2.0 g/m².

Each of the image-receiving elements (1), (3), (4), (7) and (8) prepared in Example 1 was coated on the image-receiving layer with a light reflection layer so that the amount of titanium dioxide became 20.0 g/m² and that of gelatin 2.0 g/m². On the light reflection layer was further coated with gelatin in a proportion of 0.6 g/m² to form a protective layer to prepare an image-receiving element.

Subsequently, a processing agent was prepared according to the following composition and the processing composition was enclosed into a processing pod.

| 4-Amino-N-ethyl-N-β-hydroxyethylaniline hydrochloride | 3 g |
|---|---|
| Hydroxyethylcellulose | 3.2 g |
| Piperidinohexose reductone | 0.08 g |
| Sodium hydroxide | 3 g |

The above-mentioned processing pod was placed between the aforesaid light-sensitive element and image-receiving element, and the assembly thus formed was imagewise exposed and then processed using a roller pressure instrument. Each of the photographic unit thus processed was measured in maximum density ($D_{max}$) of a dye image, after the lapse of 10 minutes from completion of the processing to obtain the results as shown in Table 2.

Table 2

| Image-receiving element | $D_{max}$ |
|---|---|
| (1) | 1.26 |
| (3) | 1.73 |
| (4) | 1.81 |
| (7) | 1.75 |
| (8) | 1.86 |

As is clear from Table 2, it is understood that in accordance with the unit of the present invention [image-receiving elements (3), (4), (7) and (8)], the elements give excellent maximum density even when the light-reflection layer is provided thereon.

EXAMPLE 3

A photographic element for diffusion transfer was prepared by successively coating a transparent acetylcellulose film support on the surface with each of the layers mentioned below.

(1) Image-receiving layer

To an aqueous solution (100 g.) containing 3% by weight of the polymer mordant of the present invention (the aforesaid exemplified compound) and 6% by weight of polyvinyl alcohol (Gosenol NH-26, produced and sold by Nippon Gosei Kagaku Kogyo K.K.) was added 0.1 g of polyoxyethylenenonylphenyl ether, and the resulting coating liquid was coated on the film support to form thereon an image receiving layer having a dry film thickness of 5μ.

(2) Light reflection layer

A coating liquid containing titanium dioxide and gelatin was coated on the layer (1) so that the amount of titanium dioxide became 20.0 g/m² and that of gelatin 2.0 g/m².

(3) Opaque layer

A coating liquid containing gelatin and carbon black was coated on the layer (2) so that the amount of gelatin became 2.0 g/m² and that of carbon black 2.0 g/m².

(4) Layer containing yellow dye image forming substance

A coating liquid containing a dye image forming substance of the following structure and gelatin was coated on the layer (3) so that the amount of the dye image forming substance became 0.1 g/m² and that of gelatin 1.0 g/m².

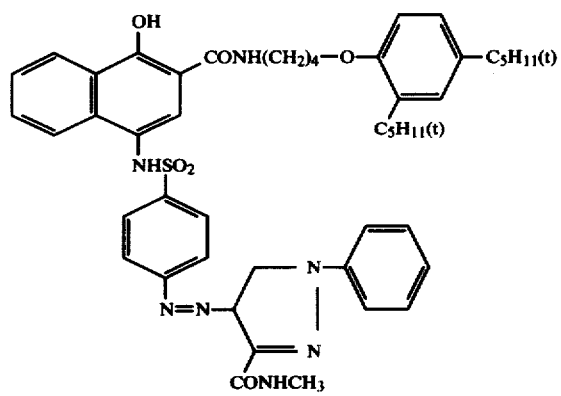

(5) Blue-sensitive emulsion layer

A blue-sensitive silver iodobromide gelatinous emulsion was coated on the layer (4) so that the amount of silver became 0.6 g/m² and that of gelatin 0.6 g/m².

(6) Protective layer

Gelatin was coated on the layer (5) in a proportion of 0.5 g/m².

The processing sheet used was a transparent polyethylene terephthalate film.

A processing solution was prepared according to the following composition: Composition of the processing solution:

| Hydroxyethylcellulose | 2.5 g |
|---|---|
| Sodium hydroxide | 6.0 g |
| 4-Hydroxymethyl-4-methyl-1-phenyl-3-pyrazolidone | 0.8 g |
| Potassium iodide | 0.001 g |
| 5-Methylbenzotriazole | 0.08 g |
| t-Butylhydroquinone | 0.08 g |
| Sodium sulfate | 0.2 g |
| Carbon black | 4.0 g |
| Water to make | 100 ml |

A processing pod having enclosed therein the above-mentioned processing solution was placed between the aforementioned photographic element and the above-mentioned processing sheet to form an assembly. The assembly was imagewise exposed and then subjected to development processing using a roller pressure instrument. A color image obtained on the photographic element was measured in maximum density ($D_{max}$) after the lapse of 10 minutes from completion of the processing using a blue filter to obtain the results as shown in Table 3.

The above-mentioned photographic element using the known polymer mordant poly-4-vinylpyridine in place of the present polymer mordant was used in this example as a control.

Table 3

| Photographic unit | Polymer mordant | $D_{max}$ |
|---|---|---|
| (9) | Poly-4-vinylpyridine | 1.12 |
| (10) | Compound (2) | 1.58 |
| (11) | " (4) | 1.50 |
| (12) | " (8) | 1.56 |
| (18) | " (9) | 1.50 |

As is clear from Table 3, it is understood that photographic units (10), (11), (12) and (13) according to the present invention individually give a color image excellent in maximum density.

EXAMPLE 4

Photographic elements were prepared in the same manner as in Example 3, except that a processing sheet was prepared by coating successively a polyethylene terephthalate film support on the surface with each of the following layers.

(1) Scavenger layer

A mixture comprising 4 parts of polyacrylic acid and 1 part of a polymer mordant was coated on the film support in a proportion of 20.0 g/m².

(2) Intermediate layer (a timing layer)

A polymer mixture comprising 95 parts of cellulose acetate and 5 parts of a styrene-maleic anhydride copolymer was coated on the layer (1) in a proportion of 3.0 g/m².

The photographic units were individually subjected to development processing and then measured in minimum density ($D_{min}$) after the lapse of 1 day from completion of the processing to obtain the results as shown in Table 4.

Table 4

| Photographic unit | (Image-receiving layer and scavenger layer) Polymer mordant | $D_{min}$ |
|---|---|---|
| (9) | Poly-4-vinylpyridine | 0.34 |
| (10) | Compound (2) | 0.13 |
| (11) | " (4) | 0.13 |
| (12) | " (8) | 0.16 |
| (13) | " (9) | 0.14 |

Notes:
The photographic units (9) through (13) in the above table were individually an assembly comprising the photographic element prepared in Example 3 and the processing sheet having a scavenger layer prepared in this example.

As is clear from Table 4, it is understood that in each of the photographic units (10) through (13) according to the present process, an increment of $D_{min}$ can be suppressed to a lower level.

EXAMPLE 5

Photographic units were individually prepared in the same manner as in Example 4, except that an image-receiving layer having a dry film thickness of 5 was prepared using, as an image-receiving layer constituting material, the known polymer mordant poly-4-vinyl-pyridine/gelatin (weight ratio being 1:2). The photographic units were individually subjected to development processing and then measured in $D_{min}$ after the lapse of 1 day from completion of the processing to obtain the results as shown in Table 5.

Table 5

| Photographic unit | Compound in scavenger layer | $D_{min}$ |
|---|---|---|
| (9) | Control | 0.30 |
| (10) | Compound (2) | 0.15 |
| (11) | " (4) | 0.17 |
| (12) | " (8) | 0.15 |
| (13) | " (9) | 0.19 |

As a control, the photographic unit having a scavenger layer incorporated with poly-4-vinylpyridine was used. From the results in Table 5, it is understood that in each of the photographic units (10) through (13) according to the present invention, an increment of $D_{min}$ can be suppressed to a lower level.

EXAMPLE 6

Photographic units were individually prepared in the same manner as in Example 3, except that a light reflection layer was incorporated with 10% by weight, based on the weight of gelatin, of a polymer mordant (the aforementioned exemplified compound). Each of the photographic elements thus prepared were individually subjected to development processing and then measured in $D_{max}$ and $D_{min}$ after the lapse of 10 minutes from completion of the processing to obtain the results as shown in Table 6.

Table 6

| Photographic unit | Exemplified compound | $D_{max}$ | $D_{min}$ |
|---|---|---|---|
| (9) | Control | 1.10 | 0.32 |
| (10) | (2) | 1.42 | 0.13 |
| (11) | (4) | 1.57 | 0.15 |
| (12) | (8) | 1.59 | 0.17 |
| (13) | (9) | 1.53 | 0.15 |

As a control, a photographic unit prepared by using the known poly-4-vinylpyridine was used.

As is clear from Table 6, it is understood that in each of photographic units (10) through (13) according to the present invention $D_{max}$ is high and an increment of $D_{min}$ is suppressed to a lower level.

What we claim is:

1. A color diffusion transfer photographic unit containing a silver halide photosensitive element having a support and at least one silver halide emulsion layer thereon, and an image receiving element having a support and an image-receiving layer thereon, said unit comprising a polymer having a first monomer having a tertiary nitrogen atom represented by the following formulae

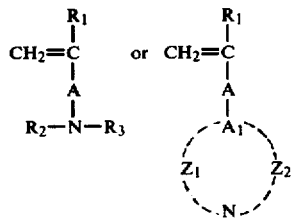

wherein $R_1$ represents hydrogen or methyl group, $R_2$ and $R_3$ individually represent lower alkyl, phenyl or aralkyl, and $R_2$ and $R_3$ may, together, form a 5- or 6-membered heterocyclic ring with the nitrogen wherein said ring may have at least one substituent; and A represents a simple bond or a bond group comprising at least two members selected from the group consisting of hydrogen, carbon, nitrogen and oxygen; $A_1$, $Z_1$ and $Z_2$ are atoms necessary to complete a 5- or 6-membered heterocyclic ring containing the nitrogen wherein said ring may have at least one substituent; at least 5 mole % of said first monomer having said tertiary nitrogen grafted and/or graft-copolymerized with a second monomer, represented by the following formulae

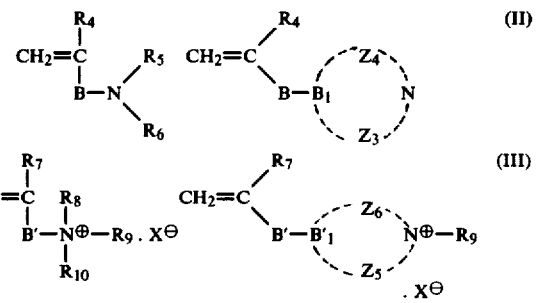

wherein $R_4$ and $R_7$ individually represent hydrogen, halogen, and methyl; $R_5$ and $R_8$ individually represent lower alkyl, phenyl and aralkyl and $R_5$ and $R_6$ as well as $R_8$ and $R_{10}$ may cooperatively form a 5- or 6-membered heterocyclic ring containing the nitrogen wherein said ring may have at least one substituent; $R_6$ and $R_9$ individually represent lower alkyl and aralkyl; $R_{10}$ represents hydrogen, lower alkyl and aralkyl; and B and B' individually represent a single bond, or a bond group comprising at least two members selected from hydrogen, carbon, nitrogen and oxygen; $B_1$, $Z_3$ and $Z_4$, as well as $B'_1$, $Z_5$ and $Z_6$ are atoms necessary to complete a 5- or 6-membered heterocyclic ring containing the nitrogen, wherein said ring may have at least one substituent; and X is anion.

2. The color diffusion transfer photographic unit as claimed in claim 1 wherein the polymer has been graft-copolymerized with the second monomer having a tertiary nitrogen atom.

3. The color diffusion transfer photographic unit as claimed in claim 1 wherein the polymer has been graft-copolymerized with said second monomer having quatenary nitrogen at the tertiary nitrogen of said first monomer.

4. The color diffusion transfer photographic unit as claimed in claim 1 wherein the polymer has been copolymerized with a mixture of said second monomer containing tertiary nitrogen and said second monomer containing quaternary nitrogen.

5. A color diffusion transfer photographic unit as claimed in claim 1 wherein the polymer is present in the image-receiving element.

6. A color diffusion transfer photographic unit as claimed in claim 5 wherein the image-receiving element comprises an image-receiving layer containing said polymer.

7. A color diffusion transfer photographic unit as claimed in claim 6 wherein said image-receiving layer has a dry thickness of 3–10μ.

8. The color diffusion transfer photographic unit as claimed in claim 7 wherein the amount of the polymer in the image-receiving layer is 10–100% by weight.

9. The color diffusion transfer photographic unit as claimed in claim 6 wherein the unit further comprises said image-receiving element having thereon said photographic element having therein said processing sheet.

10. A color diffusion transfer photographic unit as claimed in claim 1 wherein the unit further comprises the image-receiving element having thereon the photographic element having thereon a processing sheet containing said polymer.

11. A color diffusion transfer photographic unit as claimed in claim 10 wherein the processing sheet comprises a scavenger layer containing said polymer.

12. The color diffusion transfer photographic unit as claimed in claim 11 wherein said scavenger layer has a dry thickness of 0.5–10μ.

13. The color diffusion transfer photographic unit as claimed in claim 12 wherein the amount of the polymer in the scavenger layer is 10–100% by weight.

* * * * *